United States Patent [19]

Bitter

[11] Patent Number: 4,841,670
[45] Date of Patent: Jun. 27, 1989

[54] APPARATUS FOR SUPPORTING PLANTS

[76] Inventor: Paul L. Bitter, 27377 Fostoria Rd., Genoa, Ohio 43430

[21] Appl. No.: 193,052

[22] Filed: May 12, 1988

[51] Int. Cl.⁴ ............................................. A01G 17/06
[52] U.S. Cl. ..................................... 47/47; 47/DIG. 6
[58] Field of Search .................. 47/23, 39, 40.5, 41 R, 47/42, 43, 44, 45, 46, 47, DIG. 6

[56] References Cited

U.S. PATENT DOCUMENTS

| | | | |
|---|---|---|---|
| 601,691 | 4/1898 | Watson | 47/23 |
| 897,006 | 8/1908 | Müller | 47/47 |
| 2,030,249 | 2/1936 | Goldberg | 47/44 |
| 2,435,539 | 2/1948 | Gould | 47/44 |
| 2,763,096 | 9/1956 | Roger | 47/41 |
| 3,026,649 | 3/1962 | Barakauskas | 47/47 |
| 3,105,327 | 10/1963 | Gasper | 47/47 |
| 3,264,783 | 8/1966 | Bayliss | 47/45 |
| 3,857,804 | 12/1974 | Glatti et al. | 47/DIG. 6 |
| 3,878,590 | 4/1975 | Bolger | 47/44 |
| 4,019,280 | 4/1977 | Summers | 47/45 |
| 4,662,106 | 5/1987 | Mori | 47/17 |

Primary Examiner—Robert A. Hafer
Assistant Examiner—Charles H. Sam
Attorney, Agent, or Firm—Marshall & Melhorn

[57] ABSTRACT

An apparatus for supporting growing plants such as tomato plants, including radially arranged poles projecting from an annular base mounted on the top of a soil containing pot. The stems or branches of the plant are guided upwardly and within the space defined by the poles by means of strings tying the stems or branches securely around the poles.

17 Claims, 2 Drawing Sheets

APPARATUS FOR SUPPORTING PLANTS

BACKGROUND OF THE INVENTION

The present invention relates to an apparatus for supporting plants, such as a tomato plant, for example. More particularly, the invention relates to a space-saving and easily assembled gardening apparatus used for growing plants.

Through the efforts of genetic engineers and scientists, the quality and the quantity of crop bearing plants are steadily improving. The total weight of tomatoes, for example, on a tomato plant may prevent the stems and branches from growing straight and upright and eventually may cause damage by the breakage of the stems or branches.

In order to efficiently accommodate more plants in a given area, it is preferred that the plants grow upwardly by loosely fastening the stems on a supporting structure. One attempt to deal with this problem has been the utilization of a fence-like structure or trellis to support the crop burdened stems. However, it has been found the productivity of the plant is reduced by forcing the plant to climb on a trellis in two dimensions. Another attempt has been to place a cage formed by a network of wire, wood, string, or the like, on the top of the plant so as to provide a three-dimensions supporting structure. Nevertheless, the bulky cage causes storage problems for those who store more than a few.

If the seasonal plant is grown in a pot outdoors and allowed to climb on a trellis or caging on a ground fixed supporting structure, the pot cannot be relocated with facility to indoors in the late season when adverse temperature changes occur. As a result, the harvest period is shortened and immature crop is wasted. Also, the plant on such supporting structure cannot be relocated to avoid or minimize daily problems such as heavy rain, strong wind, insects, strong sunlight, or the like.

An object of the present invention is to provide a plant supporting structure which overcomes problems of the existing supporting structures.

Another object of the present invention is to provide a space-saving plant supporting structure which may be easily assembled for use and disassembled for storage or transit.

Another object of the present invention is to provide a gardening apparatus which allows the seasonal plants to be grown indoors in all seasons.

SUMMARY OF THE INVENTION

The above objects of the invention, as well as others, are typically achieved by a plant supporting apparatus including an annular base and radially arranged array of upwardly extending poles all of which are suitably mounted on a soil containing pot.

The soil containing pot with a growing plant therein is typically positioned on a horizontal ground engaging plate fixed on the ground by appropriately arranged ground piercing spikes. The plant supporting apparatus is then mounted securely on the top of the pot. Strings may be used to tie the branches or vines of the plant to the poles in order to guide the growth of the plant upwardly and inside the space defined by the poles. The apparatus not only saves space to accommodate more plants in the same area, but also improves the harvesting of the product and increases the crop productivity.

BRIEF DESCRIPTION OF THE DRAWINGS

The above, as well as other objects and advantages of the invention, will become readily apparent to one skilled in the art from reading the following detailed description of the preferred embodiment of the invention as considered in the light of the accompanying drawings, in which.

DESCRIPTION OF THE PREFERRED EMBODIMENT

Figures 1, 2, 3, 4:
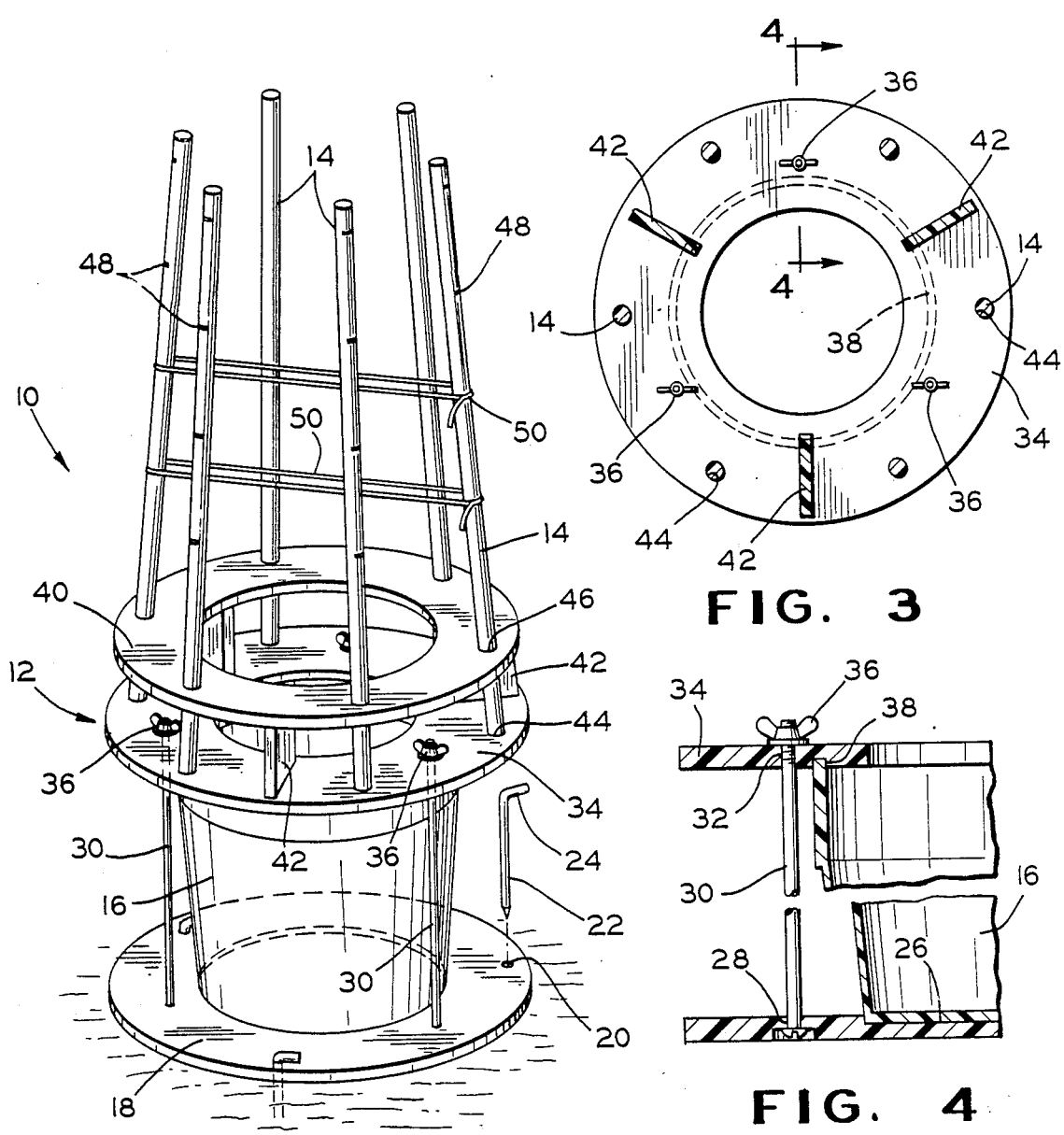
FIG. 1 is a perspective view of a plant supporting apparatus embodying the features of the invention.
FIG. 2 is an enlarged fragmentary sectional view showing a portion of the apparatus illustrated in FIG. 1.
FIG. 3 is a sectional view taken alone line 3—3 of FIG. 2.
FIG. 4 is an enlarged fragmentary sectional view taken along line 4—4 of FIG. 3.

Referring now to FIG. 1 of the drawings, wherein there is illustrated one embodiment of a plant supporting apparatus 10 embodying the features of the present invention and including an annular base 12 with radially arranged poles 14 extending thereon mounted on a soil containing pot 16.

A ring-shaped plate 18 having a plurality of spaced apart apertures 20 is anchored to the ground by respective ground piercing spikes 22 which are adapted to extend through the apertures 20 and thence into the ground. The spikes 22 are forced into the ground by means of any suitable tools until the head 24 of the spike 22 is generally in contact with the upper surface of the plate 18. It will be understood that the spikes 22 can be readily removed when the pot 16 is to be relocated or disassembled for storage.

As best shown in FIGS. 3 and 4, the soil containing pot 16, which may have a seedling, such as tomato plant, for example planted therein, is placed and retained on a shallow cavity 26 formed in the upper surface of the plate 18. It will be understood that the pot 16 can be made of plastic, wood, ceramic, or the like.

The plate 18 is provided with suitably disposed apertures 28 through which threaded rods 30 are caused to project and extend through corresponding receiving apertures 32 formed in a lower annular collar 34 of the annular base 12. By the application and tightening of a wing nut 36 on the rod 30 above the lower collar 34, upper portion of the pot 16 is caused to be received in an associated groove 38 formed in the bottom lower surface of the lower annular collar 34 so as to stabilize the supporting apparatus 10.

The annular base 12 of the plant supporting apparatus 10 includes an annular collar 40 maintained in spaced relation from the upper surface of the annular collar 34 by spacers 42. The lower end of the poles 14 are caused to project upwardly from holes 44 in the lower collar 34 and are adapted to extend suitably through aligned holes 46 in the upper collar 40. Due to the fact that the holes 46 of the collar 40 are situated closer to the vertical axis of the base 12 than the holes 44 of the collar 24, the poles 14 are inclined toward the central axis of the supporting apparatus 10.

The annular base 12 of the apparatus 10 can be used to reduce the sunlight absorption on the surface of the soil in the pot 16 so as to minimize the germination of weed seeds. Also, the base 12 will tend to maintain moisture in the soil in the pot 16; and effectively maintain soil temperature of the soil; and prevent flooding in the pot 16 due to precipitation.

The poles 14 are inclined inwardly to assist in guiding the stems, vines, branches or the like of the plant growing within the space defined by the poles 14. Notches 48 may be provided on the poles 14 above the upper annular collar 40 at any desired interval to facilitate the placing of strings 50 or other appropriate material thereon to assist in supporting any crops of the plant. The poles 14 and the strings 50 function to prevent the stems and associated crop from contacting the adjacent ground, and thus militate against rotting or other such damage thereto which might be caused by animals, or harmful organisms. Further, the associated plants are caused to grow upright facilitating the spraying and harvesting.

The present invention is advantageous in that it can be used both indoors and outdoors. The seasonal plants are allowed to grow in the apparatus 10 in all seasons. It will be understood that the strings 50 can be tied on or around any one or more poles 14 in accordance with the direction the plant tends to grow. Also, a wide range of length of the poles 14 can be chosen in the apparatus 10 in accordance with the maximum height of the associated plant.

It will be appreciated that the components of the structure described in the foregoing description can be fabricated from a wide variety of materials. One material which will provide satisfactory results is an optically transparent acrylic resin. Since such material is optically transparent the entire assembly will tend to take on the appearance or color of the contained plant, and thereby add to the overall aesthetics thereof.

Figure 5:
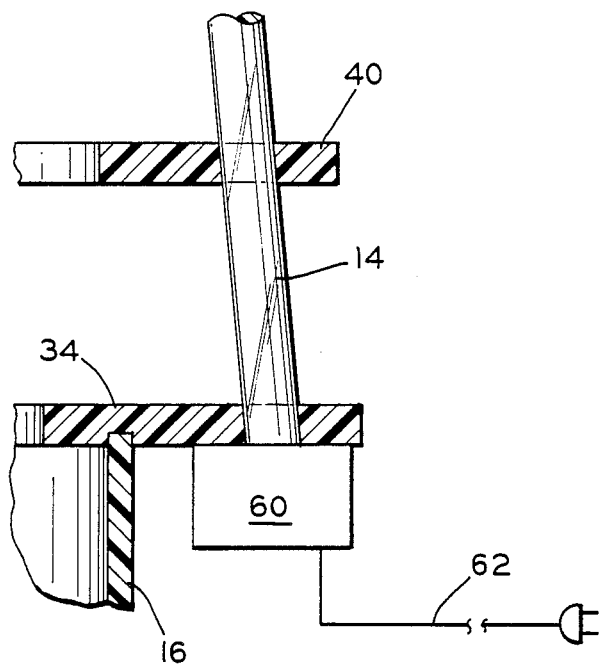
FIG. 5 is an enlarged fragmentary sectional view showing a portion of the apparatus illustrated in FIG. 2 specifically showing the association of a source of growing light positioned adjacent at least one of the poles 14.

Also, by utilizing an optically transparent material such as an acrylic resin for the construction of at least the poles 14, a source of light 60, as schematically illustrated in FIG. 5 may be disposed adjacent the bottom of at least one of the poles 14. The light source 60 is typically coupled to a source of electrical energy through a conductor 62. The light 60 is capable of producing light in the range of 535 to 700 nanometers which will assist in the photosynthesis process to promote the growth of a plant upon which the light energy would impinge. The light produced by the light source than is able to be conducted through poles 14 and caused to be emitted therefrom and impinge on the associated plant.

It should be understood that the apparatus 10 of this invention is not limited in use with tomatoe plants, but has application wherever it is desired to provide a support structure to any flowering or fruit bearing plant.

It is to be understood that the form of the invention herein shown and described is to be taken as an illustrative embodiment only of the same, and that various changes in the shape, size and arrangement of parts, may be restored to without departing from the spirit of the invention.

What is claimed is;

1. Plant growing and supporting apparatus comprising a generally cylindrical pot for containing a body of soil adapted for growing a plant therein, a base plate upon which said pot is supported, an annular base atop said pot, said annular base including a first annular collar supported upon the top of said pot and a second annular collar maintained in spaced relation above said first collar, means urging said base plate and first annular collar toward one another and against the bottom and top, respectively, of said pot, and a plurality of columns extending upwardly from and disposed radially around said annular base for supporting a plant growing upwardly through said first and second annular collars from said pot.

2. Plant growing and supporting apparatus as claimed in claim 1, including spacer means disposed between said first and second annular collars for maintaining said annular collars in said spaced relation.

3. Plant growing and supporting apparatus as claimed in claim 1, including a cavity in said base plate adapted to receive the bottom of said pot.

4. Plant growing and supporting apparatus as claimed in claim 1, including a groove in the lower surface of said first annular collar adapted to receive the lip defining the top of the side wall of said pot.

5. Plant growing and supporting apparatus as claimed in claim 1, including an opening in said first annular collar for receiving the lower end of each said column, and an aligned opening in said second annular collar through which said column extends upwardly.

6. Plant growing and supporting apparatus as claimed in claim 1, wherein said means urging said base plate and first annular collar toward one another comprises corresponding pairs of apertures in said base plate and first annular collar, and a rod extending through each said pair of apertures, each said rod including means adjustably bearing against said base plate and collar and urging them toward one another.

7. Plant growing and supporting apparatus as claimed in claim 2, including a cavity in said base plate adapted to receive the bottom of said pot, a groove in the lower surface of said first annular collar adapted to receive the lip defining the top of the side wall of said pot, an opening in said first annular collar for receiving the lower end of each said column and an aligned opening in said second annular collar through which said column extends upwardly therebeyond, said means urging said base plate and first annular collar toward one another comprising corresponding pairs of apertures in said base plate and first annular collar and a rod extending through each said pair of apertures, each said rod including means adjustably bearing against said baseplate and first collar and urging them toward one another.

8. The invention defined in claim 1 wherein said annular base contains an array of apertures for receiving the end portion of said columns.

9. The invention defined in claim 8 wherein at least said columns and said annular base are formed of a plastic material.

10. The invention defined in claim 9 wherein said plastic material is optically transparent.

11. The invention defined in claim 10 wherein said plastic material is an acrylic.

12. The invention defined in claim 11 including a source of light energy disposed adjacent at least one end of one of said columns.

13. The invention defined in claim 12 wherein said light source produces light in the range of about 500 to about 700 nanometers.

14. The invention claimed in claim 1 wherein said supporting columns are provided with spaced apart notches.

15. The invention defined in claim 14 wherein said notches are provided with plant supporting line means.

16. The invention defined in claim 15 wherein said line means comprises string.

17. The invention claimed in claim 1 wherein said columns are caused to upwardly and inwardly.

* * * * *